(12) United States Patent
Wall

(10) Patent No.: US 10,538,305 B2
(45) Date of Patent: Jan. 21, 2020

(54) DOVETAIL AIRCRAFT WINDSCREEN

(71) Applicant: John Wall, Andover, OH (US)

(72) Inventor: John Wall, Andover, OH (US)

(73) Assignee: Tyson Valdez, LLC, Andover, OH (US)

( * ) Notice: Subject to any disclaimer, the term of this patent is extended or adjusted under 35 U.S.C. 154(b) by 350 days.

(21) Appl. No.: 15/410,241

(22) Filed: Jan. 19, 2017

(65) Prior Publication Data

US 2018/0201358 A1    Jul. 19, 2018

(51) Int. Cl.
*B64C 1/14*    (2006.01)

(52) U.S. Cl.
CPC ................... *B64C 1/1492* (2013.01)

(58) Field of Classification Search
CPC ........ B64C 1/1492; B64C 1/1476; B64C 1/14
See application file for complete search history.

(56) References Cited

U.S. PATENT DOCUMENTS

| | | | | |
|---|---|---|---|---|
| 2,121,094 | A * | 6/1938 | Nuding | E06B 1/38 52/204.65 |
| 2,575,854 | A * | 11/1951 | Verhagen | B60J 1/001 52/127.8 |
| 4,004,388 | A * | 1/1977 | Stefanik | B32B 17/10293 244/121 |
| 6,818,281 | B2 * | 11/2004 | Blevins | B32B 17/10036 296/187.03 |
| 6,892,984 | B2 * | 5/2005 | Wood | B64C 1/1476 244/121 |
| 7,118,070 | B2 * | 10/2006 | Abrams | B60J 1/006 244/129.3 |
| 7,552,896 | B2 * | 6/2009 | Coak | B64C 1/1492 244/129.3 |
| 9,174,721 | B2 * | 11/2015 | Dazet | B64C 1/1492 |
| 2015/0082708 | A1 * | 3/2015 | Eilken | B64C 1/1407 49/477.1 |

* cited by examiner

*Primary Examiner* — Justin M Benedik
(74) *Attorney, Agent, or Firm* — Fay Sharpe LLP

(57) ABSTRACT

An aircraft windscreen (100) includes: a main body; and a dovetail shaped portion (120) formed in the main body at a periphery thereof. Suitably, the windscreen (100) is secured within an opening (192) of an aircraft frame or body (190). In this regard, the aircraft has: a body (190) constructed of a first material and including an opening (192) therein; a windscreen (100) constructed of a second material and arranged within the opening (192) of the body (190); and a retaining member (400) attached to the body (190) and/or fuselage (300) by a set of fasteners (402) so as to secure the windscreen (100) thereto. Suitably, the retaining member (400) cooperates with the body and/or fuselage (300) to form a channel (200) in which a dovetailed shaped portion (120) formed at a periphery of the windscreen (100) is seated so as to be retained without through holes being formed in the windscreen (100).

11 Claims, 12 Drawing Sheets

DOVETAIL AIRCRAFT WINDSCREEN

BACKGROUND

The subject matter of the present specification relates to the art of aircraft windscreens. Exemplary embodiments disclosed herein find particular application in conjunction with airplanes, and they will be described herein with particular reference thereto. However, it is to be appreciated that various exemplary embodiments such as those disclosed herein are also amenable to other like applications and/or other types of aircrafts or vehicles.

Aircraft windscreens are generally known in the field of aviation. For example, FIG. 1 herein shows an airplane 10 including a typical windscreen 12. Commonly, as shown more clearly in FIG. 2, the windscreen 12 of the airplane 10 is fixed and/or otherwise attached to a fuselage 14 of the airplane 10 with bolts 16 or other fastener that extend through holes 18 formed in the windscreen 12. In such cases, the windscreen 12 may be prone to various modes of failure and/or other undesirable drawbacks or limitations.

For example, the windscreen 12 is commonly constructed of glass or acrylic material, while the fuselage 14 may be constructed of aluminum, other metal or some suitable composite material. Accordingly, the different materials may have differing coefficients of expansion and/or may experience different degrees of expansion and/or contraction under various changing conditions, e.g., resulting from temperature differentials arising due to changes in altitude during aircraft flight.

Commonly, an airplane's cabin may be pressurized for the comfort of passengers. Further expansion and/or contraction of the differing construction materials can result due to changes in the air pressures experienced at varying altitudes, e.g., including the external air pressure, the internal or cabin pressure and/or the relative pressure difference therebetween. The expansion and/or contraction of differing materials may not be the same when exposed to changing environmental conditions.

As can be appreciated, changes in the environment and/or conditions (e.g., experienced due to altitude changes, high speeds, etc. encounter during flight) such as those described above as well as other factors can place significant stress, strain and/or other structural loads on the windscreen 12. An overly rigid attachment of the windscreen 12 to the fuselage 14 can result in a failure of the windscreen 12, e.g., cracking and/or breaking of the windscreen 12 or detachment of the windscreen 12 from the fuselage 14. Generally, such failures are undesirable in and of themselves and can result in other undesirable effects, e.g., such as an unwanted loss of cabin pressure.

In otherwise conventional embodiments where fasteners or the like extend through holes in a windscreen to attach the windscreen to an aircraft fuselage, there can be insufficient play between the windscreen and fuselage to allow for differential expansion and/or contraction of materials which can lead to the buildup of excessive stress, strain and/or other structural loads resulting in the windscreen's failure. Additionally, the holes in the windscreen, which are often formed at or near a periphery of the windscreen, can further reduce the overall and/or localized strength of the windscreen and/or serve as points of potential failure (e.g., cracking or breaking of the windscreen).

Accordingly, a new and/or improved windscreen and/or windscreen attachment system is disclosed herein.

BRIEF DESCRIPTION

This Brief Description is provided to introduce concepts related to the present inventive subject matter. It is not intended to identify essential features of the claimed subject matter nor is it intended for use in determining or limiting the scope of the claimed subject matter. The exemplary embodiments described below are not intended to be exhaustive or to limit the invention to the precise forms disclosed in the following Detailed Description. Rather, the embodiments are chosen and described so that others skilled in the art may appreciate and understand the principles and practices of the present inventive subject matter.

In accordance with one aspect of the present inventive subject matter, an aircraft windscreen includes: a main body; and a dovetail shaped portion formed in the main body at a periphery thereof.

In accordance with another aspect of the present inventive subject matter, an aircraft includes: a body constructed of a first material and including an opening therein; a windscreen constructed of a second material and arranged within the opening of the body; and a retaining member attached to the body by a set of fasteners so as to secure the windscreen to the body. Suitably, the retaining member cooperates with the body to form a channel in which a dovetailed shaped portion formed at a periphery of the windscreen is seated so as to be retained without through holes being formed in the windscreen.

Numerous advantages and benefits of the inventive subject matter disclosed herein will become apparent to those of ordinary skill in the art upon reading and understanding the present specification. It is to be understood, however, that the detailed description of the various embodiments and specific examples, while indicating preferred and/or other embodiments, are given by way of illustration and not limitation. Many changes and modifications within the scope of the present invention may be made without departing from the spirit thereof, and the invention includes all such modifications.

BRIEF DESCRIPTION OF THE DRAWINGS

The following Detailed Description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION

Figure 1:
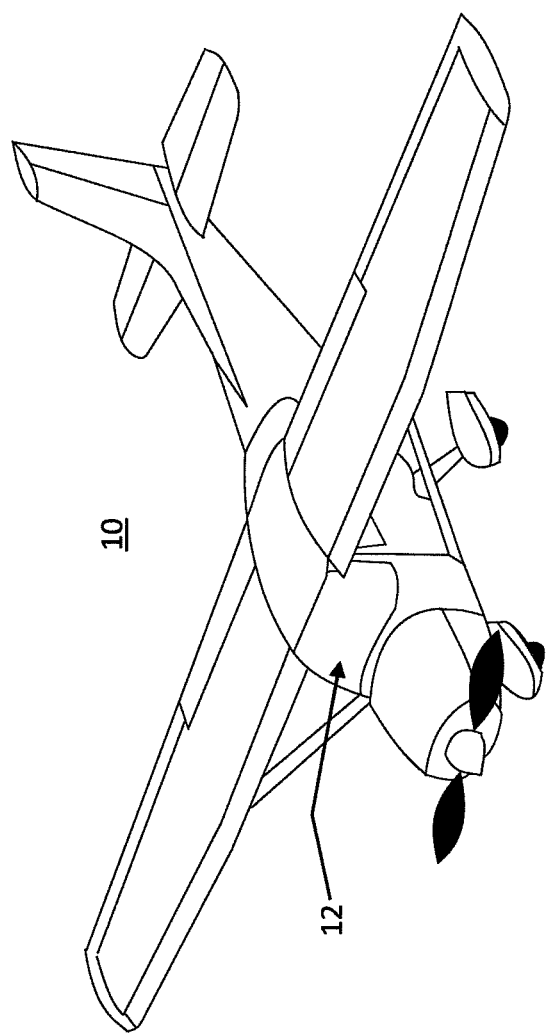
FIG. 1 is an illustration of an aircraft.
Figure 2:
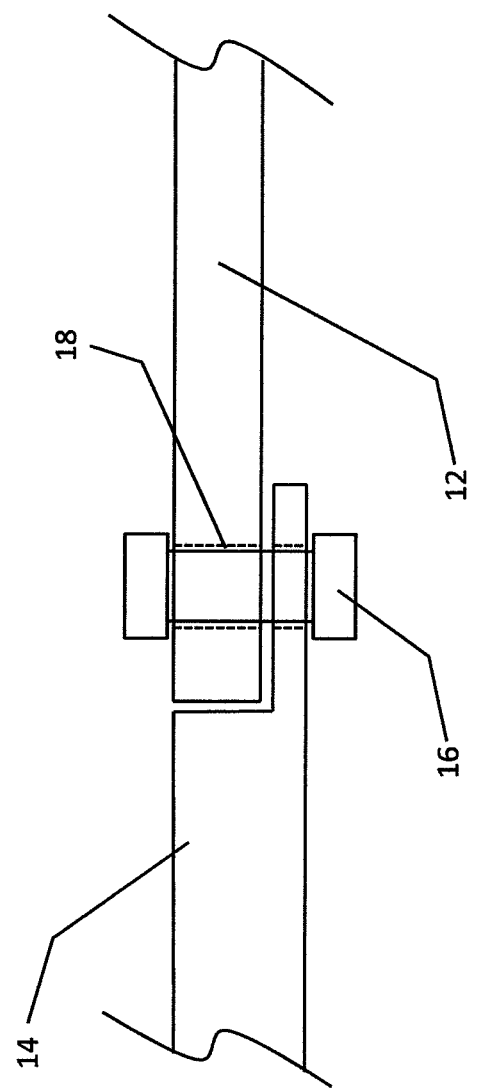
FIG. 2 is a partial cross-section view of an aircraft windscreen attached to an aircraft fuselage in accordance with conventional practices.

For clarity and simplicity, the present specification shall refer to structural and/or functional elements, relevant standards and other components, methods and/or processes that are commonly known in the art without further detailed explanation as to their configuration or operation except to the extent they have been modified or altered in accordance with and/or to accommodate the preferred and/or other embodiment(s) presented herein. Moreover, the apparatuses and methods disclosed in the present specification are described in detail by way of examples and with reference to the figures. Unless otherwise specified, like numbers in the figures indicate references to the same, similar or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific materials, techniques, arrangements, etc. are either related to a specific example presented or are merely a general description of such a material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the figures.

In general, there is disclosed herein an aircraft windscreen and accompany mechanical system for securing and/or otherwise attaching the same to an aircraft fuselage or fame. In one suitable embodiment, the windscreen is a continuous unperforated sheet or expanse of material, i.e., without any through holes or the like formed therein. Extending around an outer periphery of the windscreen there is formed a dovetail. The dovetail generally includes an outer portion and an opposing inner portion, where the outer portion is relatively thicker than the inner portion (and conversely the inner portion is relatively thinner than the outer portion). The relatively thicker periphery end or outer portion of the dovetail is more distal and/or farther from a central region or area of the windscreen (as compared to the inner portion of the dovetail) and the relatively thinner inner region is more proximate and/or relatively closer to the central region or area of the windscreen (as compared to the outer portion of the dovetail). In one suitable embodiment, at least one oblique, sloping, inclined or otherwise gradual thickness reducing surface (generally referred to herein nominally as the oblique surface) lies between the outer and inner portions of the dovetail.

Suitably, a flange or retaining member is secured to the fuselage or frame of the aircraft, e.g., with bolts, rivets or other suitable fasteners. Together the retaining member and frame or fuselage of the aircraft form a pocket or channel therebetween which receives and captures or otherwise secures therein the dovetail shaped portion of the windscreen. In this way, the windscreen is attached or otherwise connected to the aircraft. In one particular embodiment, the channel generally takes the shape of a ring having an outer periphery which defines a pocket which is relatively wider than a gap formed at an inner periphery of the channel. In this way, the channel pocket is sized and shaped to accommodate the relatively thicker periphery end of the dovetail, while the gap in the channel allows the relatively thinner inner portion of the dovetail to extend therethrough. In practice, the gap is to narrow however to allow passage therethrough of the relatively thicker periphery end of the dovetail, and as such, the dovetail of the windscreen is captured and/or otherwise held in the channel formed between the flange and fuselage or frame of the aircraft. Consequently, the windscreen is thusly secured or attached to the aircraft.

In one suitable embodiment, a suitable gasket is placed around the dovetail to provide a cushion between the dovetail and surrounding parts when the dovetail is seated in the channel, and to provide an airtight seal between the windscreen and aircraft fuselage and/or frame. Optionally, the gasket may be made of rubber or another suitably flexible and/or cushioning material which also provides an airtight seal.

Figure 3:
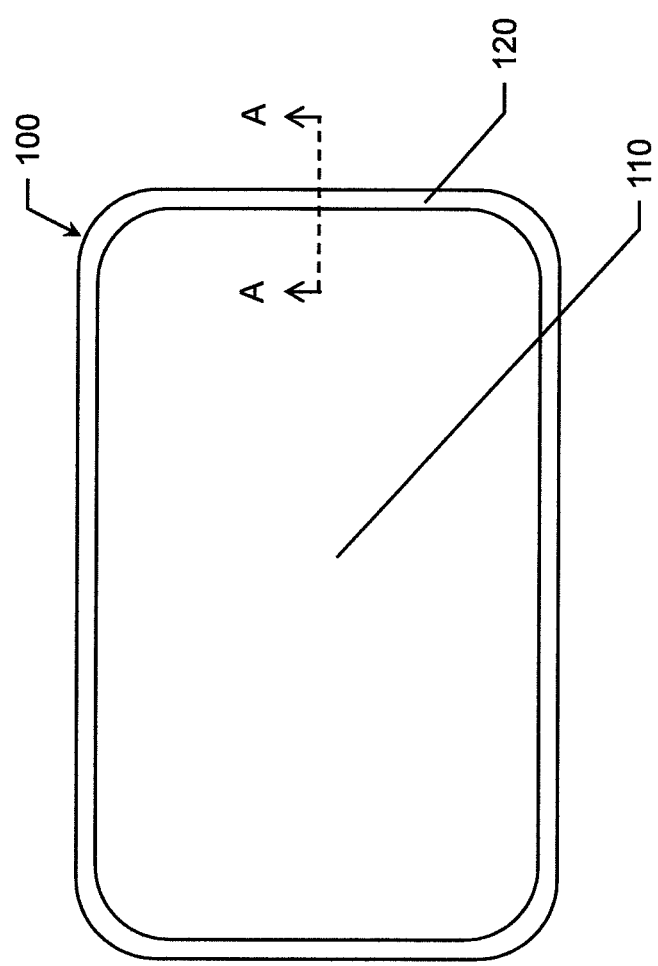
FIG. 3 is a diagrammatic illustration showing an exemplary windscreen in accordance with aspects of the present inventive subject matter.

With reference now to FIG. 3, there is shown an exemplary windscreen 100 in accordance with aspects of the present inventive subject matter. As illustrated, the windscreen 100 includes a relatively central portion or area generally indicated by reference numeral 110, and along its periphery a dovetail shaped portion 120 is formed. In the illustrated exemplary embodiment, no through holes are formed in the windscreen 100. Indeed, suitably, the windscreen 100 is a continuous unperforated sheet or expanse of material, e.g., glass, acrylic or suitable laminate. While shown for illustrative purposes as generally rectangular and planar, it is to be appreciated that in practice, the windscreen 100 may take other shapes and/or be bent or curved as appropriated for various different applications and/or to fit various different aircraft.

Figure 4:
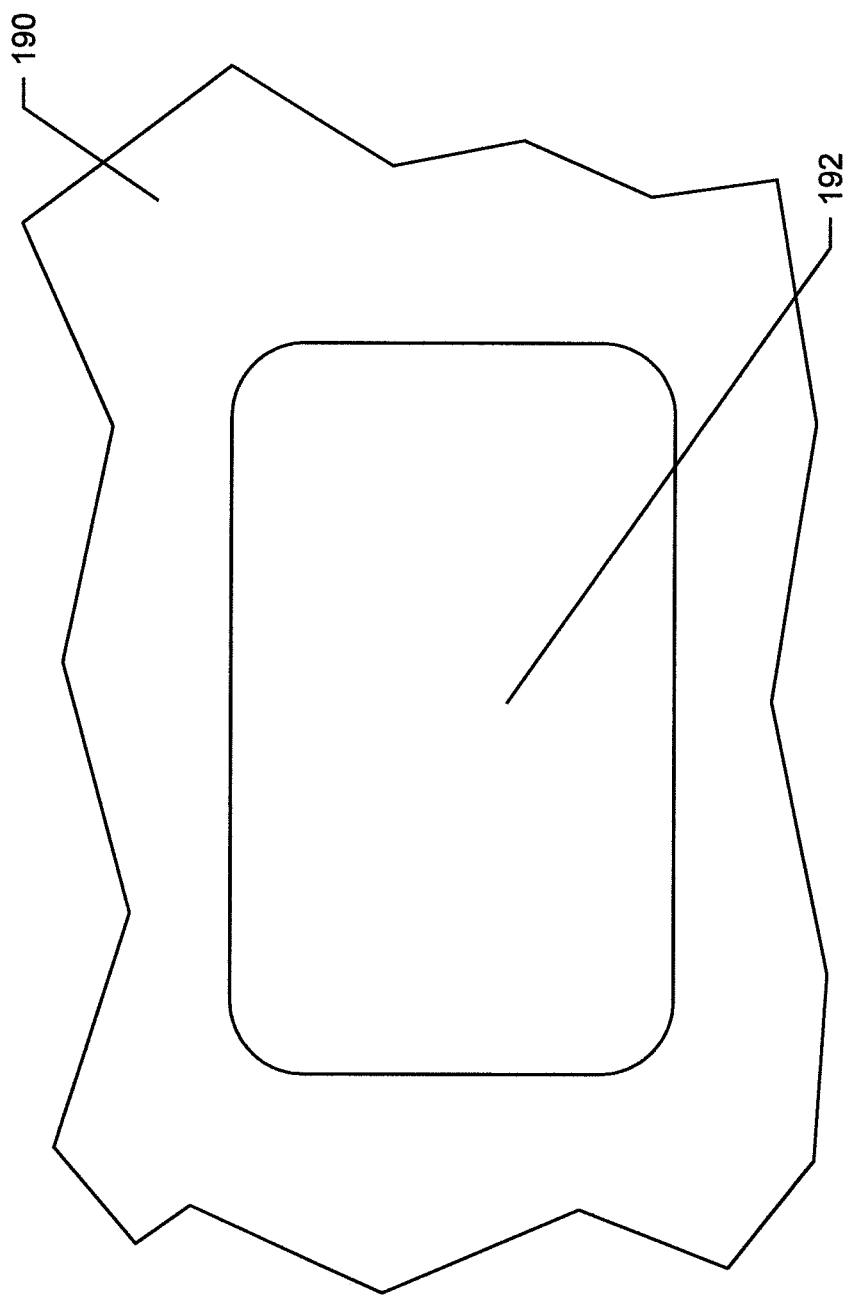
FIG. 4 is a diagrammatic illustration showing an aircraft body having an opening formed therein for receiving the windscreen of FIG. 3 in accordance with aspects of the present inventive subject matter.

In FIG. 4, there is shown a portion of an aircraft body 190 having formed therein an opening 192 into which the windscreen 100 is fitted and secured. In practice, the windscreen 100 may be constructed of glass or acrylic material or some other suitable material and/or a combination thereof, while the aircraft body 190 (and/or fuselage) may be constructed of aluminum, other metal or some suitable composite material and/or a combination thereof.

Figure 5:
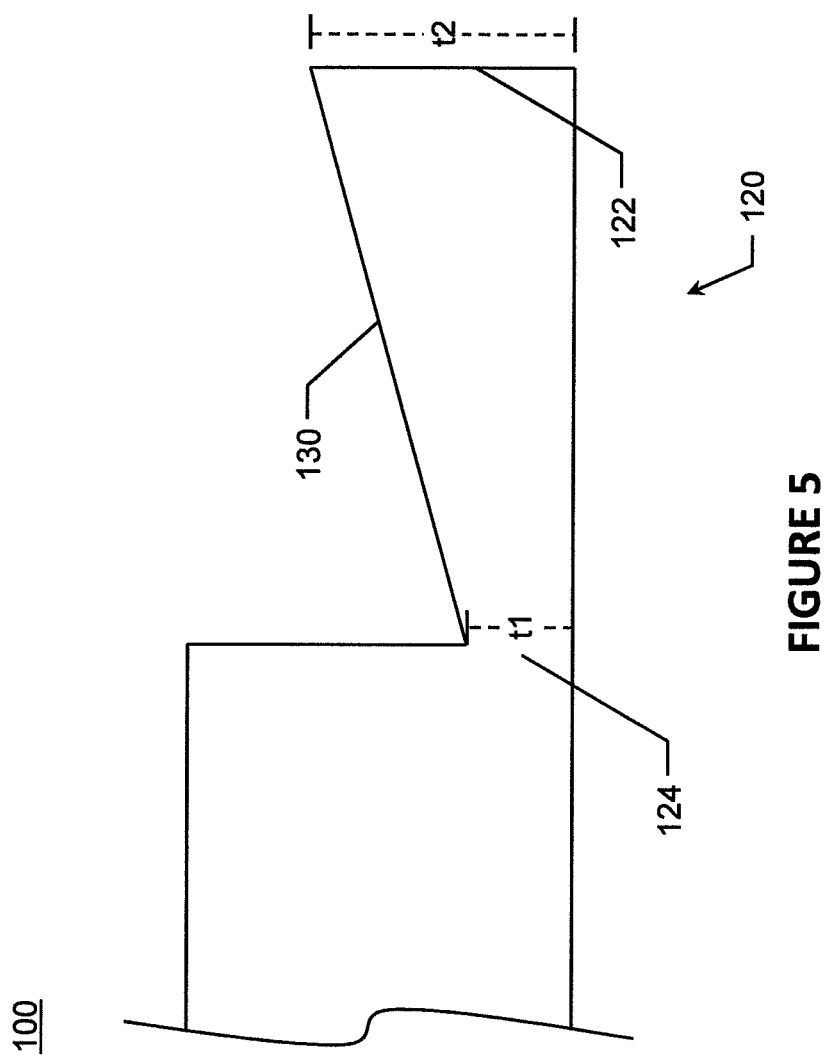
FIG. 5 is an enlarged partial cross-section view of the windscreen shown in FIG. 3 taken along section line A-A in FIG. 3.

FIG. 5 is an enlarged partial cross-section view of the windscreen 100 taken along section line A-A in FIG. 3. FIG. 5 illustrates in greater detail the dovetail shaped portion 120 formed along the periphery of the windscreen 100. As illustrated, the dovetail 120 generally includes an outer portion or end 122 and an opposing inner portion or region 124, where the outer portion or end 122 is relatively thicker than the inner portion or region 124. For example, the outer end 122 of the dovetail 120 has a thickness t2, while the inner region 124 of the dovetail 120 has a thickness t1, where t2>t1. As shown, the relatively thicker periphery end or outer portion 124 of the dovetail 120 is more distal and/or farther from the central region or area 110 of the windscreen 100 (as compared to the inner portion 124 of the dovetail 120) and the relatively thinner inner region 124 is more proximate and/or relatively closer to the central region or area 110 of the windscreen 100 (as compared to the outer portion 122 of the dovetail 120). In the illustrated exemplary embodiment, at least one oblique, sloping, inclined or otherwise gradual thickness reducing surface 130 (generally referred to herein nominally as the oblique surface) lies between the outer and inner portions of the dovetail 120.

Figure 6:
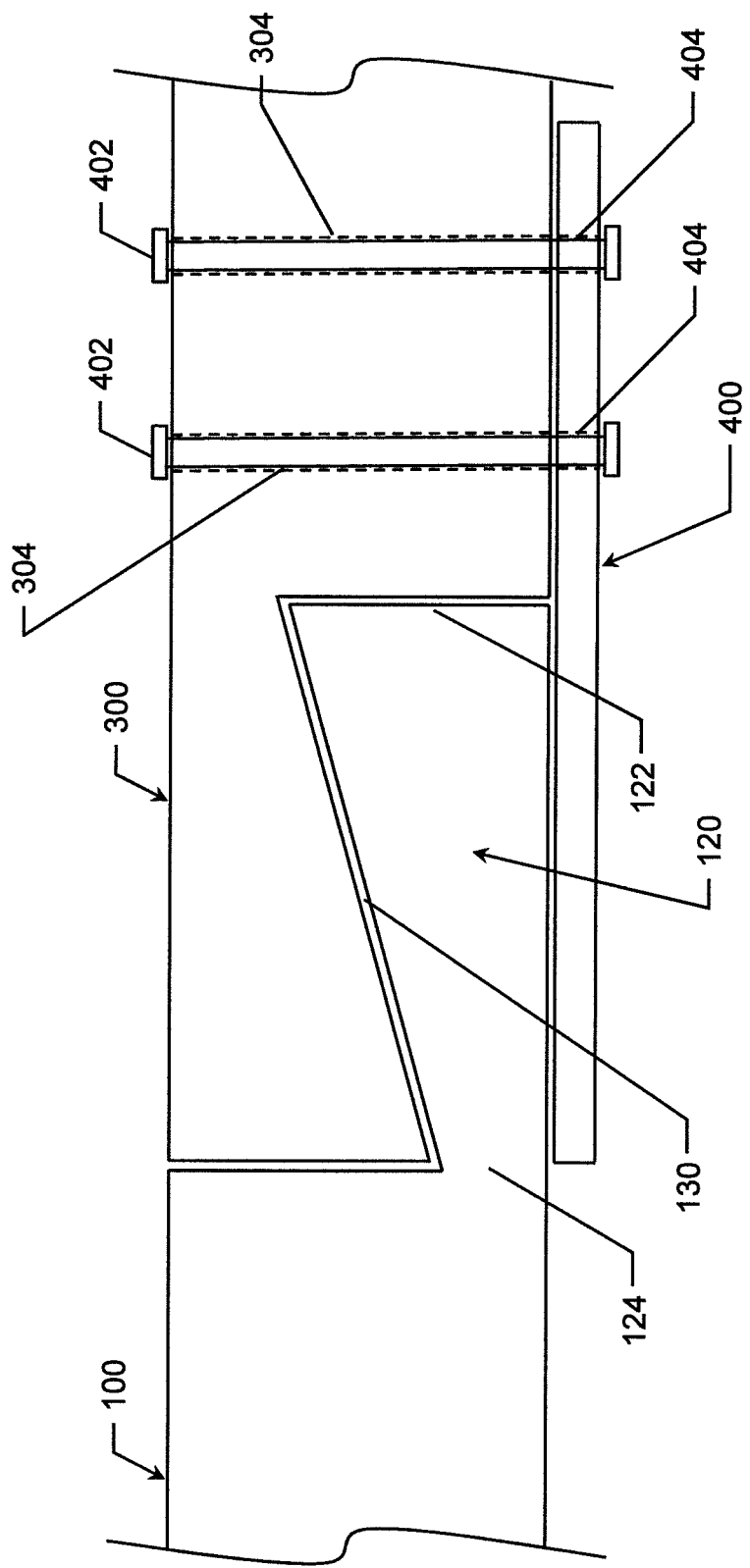
FIG. 6 is a diagrammatic illustration including the view of the windscreen from FIG. 5 and showing an exemplary manner in which the windscreen is secured to an aircraft in accordance with aspects of the present inventive subject matter.

With reference now to FIG. 6, the dovetail shaped portion 120 of the windscreen 100 is shown captured in a channel 200 (more clearly indicated in FIG. 7) formed by the aircraft's fuselage 300 and a retaining member 400 attached and/or otherwise secured to the fuselage 300, e.g., as shown with bolts 402 extending through holes 404 and 304 formed in the retaining member 400 and fuselage 300, respectively. Alternatively, the retaining member 400 may be attached and/or secured to the fuselage 300 via other suitable fasteners and/or fastening means, e.g., such as adhesives and/or the like.

Figure 7:
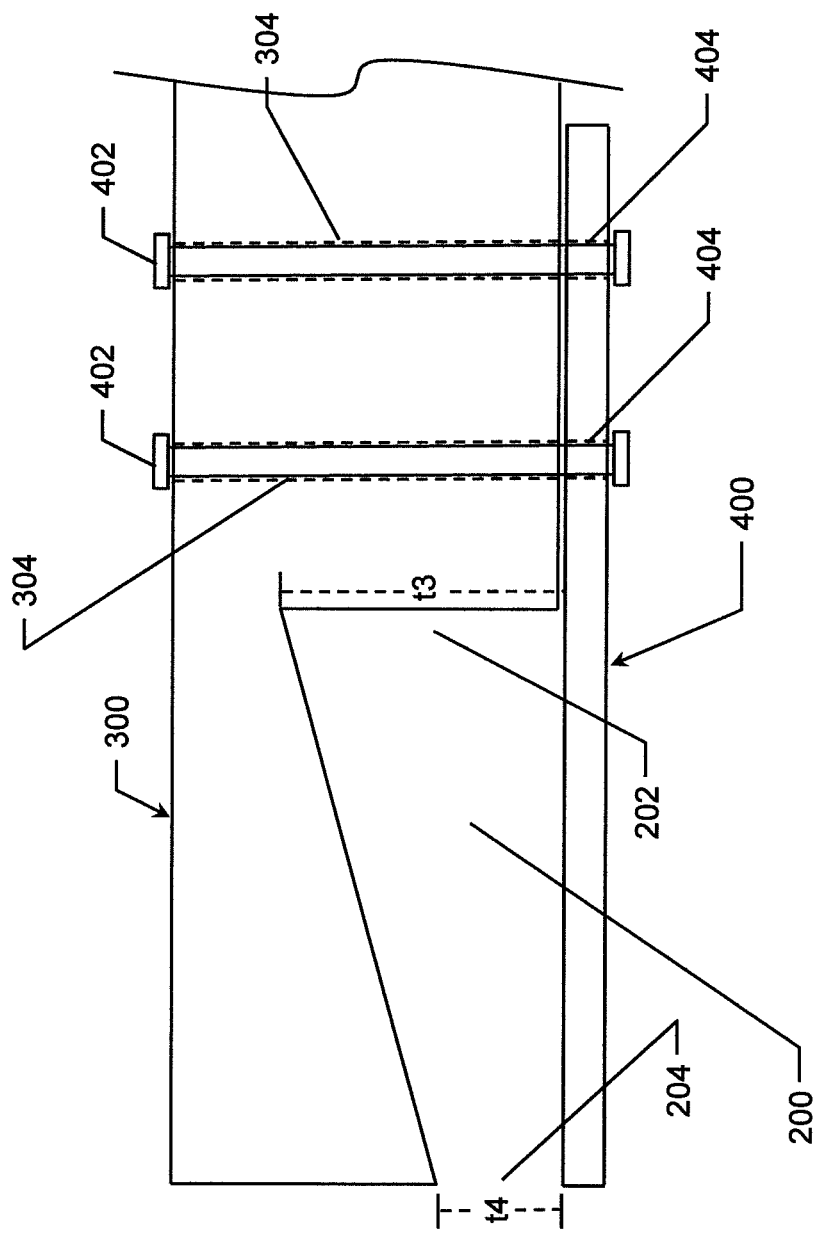
FIG. 7 is a diagrammatic illustration corresponding to FIG. 6 with the windscreen removed to better indicate a channel formed by a retaining member and aircraft fuselage.

As seen in FIG. 7, together the retaining member 400 and fuselage 300 of the aircraft form a pocket or channel 200 therebetween, which (as shown in FIG. 5) receives and captures or otherwise secures therein the dovetail shaped portion 120 of the windscreen 100. In this way, the windscreen 100 is attached or otherwise connected to the aircraft. In one exemplary embodiment, the channel 200 generally takes the shape of a ring having an outer periphery 202 which defines a pocket which is relatively wider than a gap 204 formed at an inner periphery of the channel 200. In this way, the channel pocket is sized and shaped to accommodate the relatively thicker periphery end 122 of the dovetail 120, while the gap 204 in the channel 200 allows the relatively thinner inner portion 124 of the dovetail 120 to extend therethrough. In practice, the gap 204 is to narrow however to allow passage therethrough of the relatively thicker periphery end 122 of the dovetail 120, and as such, the dovetail 120 of the windscreen 100 is captured and/or otherwise held in the channel 200 formed between the flange and/or retaining member 400 and the fuselage 300 of the aircraft. Consequently, the windscreen 100 is thusly secured or attached to the aircraft. For example, as shown, the relatively wider side 202 of the channel has a thickness t3, while the relatively narrower gap 204 has a thickness t4, where t3>t4, t4<t2, t4 is slightly greater than and/or approximately equal to t1, and t3 is slightly greater than and/or approximately equal to t2.

While not shown in FIGS. 3-7, it is to be appreciated that in practice a suitable gasket may be placed around the dovetail 120 to provide a cushion between the dovetail 120 and surrounding parts when the dovetail 120 is seated in the channel 200, and to provide an airtight seal between the windscreen 100 and aircraft fuselage 300. Optionally, the gasket may be made of rubber or another suitably flexible and/or cushioning material which also provides an airtight seal.

Figure 8:
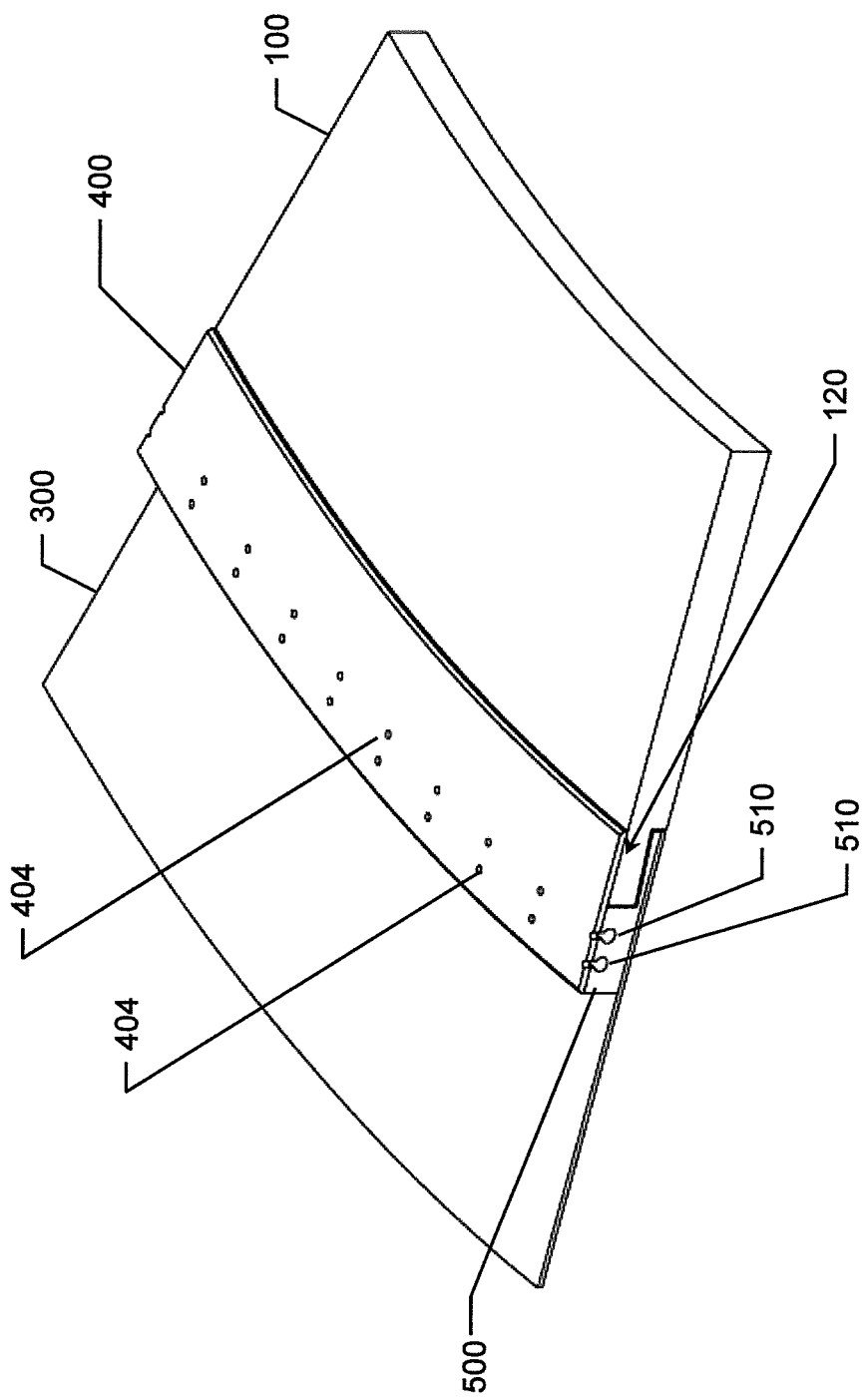
FIG. 8 is a diagrammatic illustration showing another exemplary embodiment for securing a windscreen to an aircraft fuselage in accordance with aspects of the present inventive subject matter.
Figure 9:
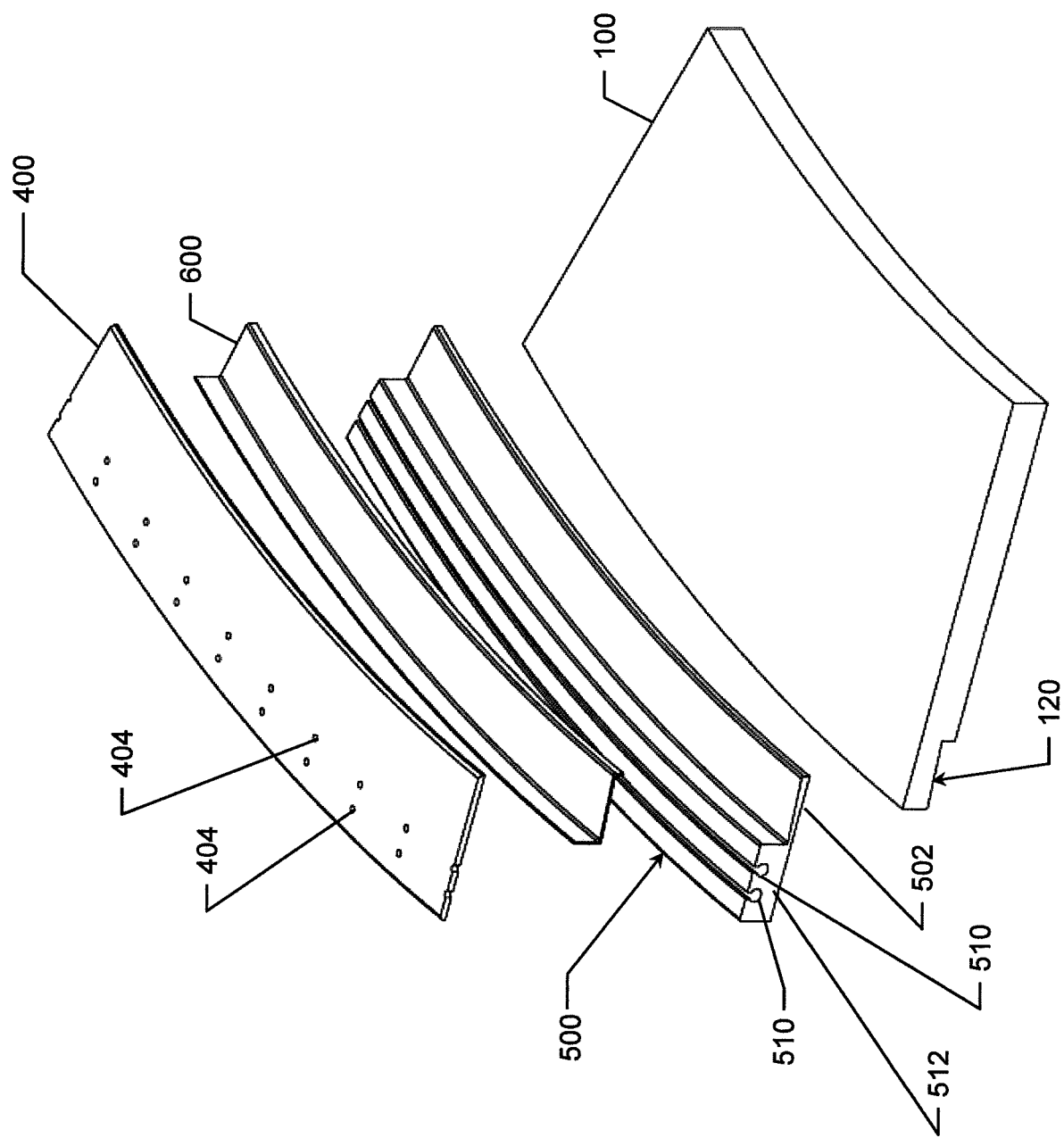
FIG. 9 is an exploded view corresponding to FIG. 8.
Figure 10:
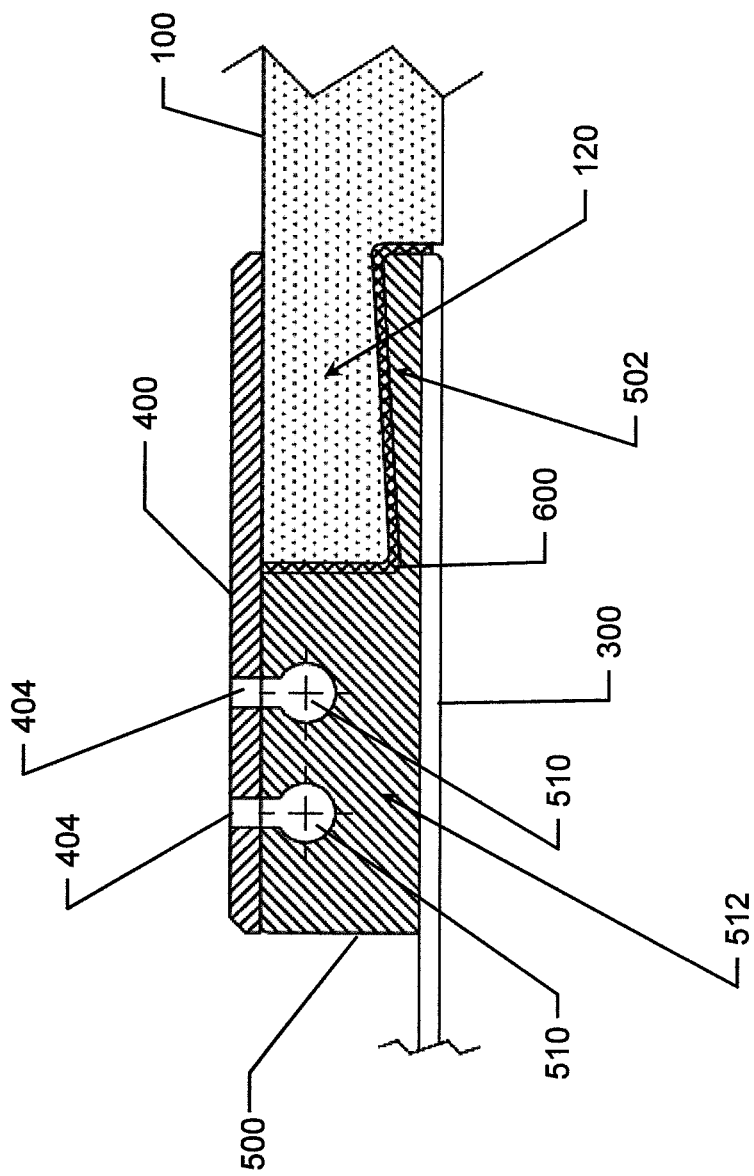
FIG. 10 is an enlarged partial cross-section view taken along section line B-B in FIG. 8.

With reference now to FIGS. 8-10, there is shown another exemplary embodiment for securing the windscreen 100 to the aircraft fuselage 300 in accordance with aspects of the present inventive subject matter. In this embodiment, a complementary flange and/or retaining member 500 is used in conjunction and/or combination with the retaining member 400 to form and/or define the channel (not referenced in the given figures) which receives and/or captures the dovetail portion 120 of the windscreen 100 (e.g., in the manner otherwise indicated with respect to the previous described embodiment(s)). As shown in the present embodiment, a suitable gasket 600 is placed around the dovetail 120 to provide a cushion between the dovetail 120 and surrounding parts when the dovetail 120 is seated in the channel, and to provide an airtight seal around a periphery of the windscreen 100. Optionally, the gasket 600 may be made of rubber or another suitably flexible and/or cushioning material which also provides an airtight seal.

As shown in FIGS. 8-10, the complementary retaining member 500 also has a dovetail portion 502 which cooperates with the retaining member 400 to help form and/or define the channel which receives and holds therein the dovetail portion 120 of the windscreen 100. Suitably, the complementary retaining member 500 is attached and/or otherwise secured to the fuselage 300 of the aircraft with a suitable adhesive and/or the like so as to encircle the opening 192 in the aircraft body 190 (see, e.g., FIG. 4 showing the opening 192 and body 190).

Figure 11:
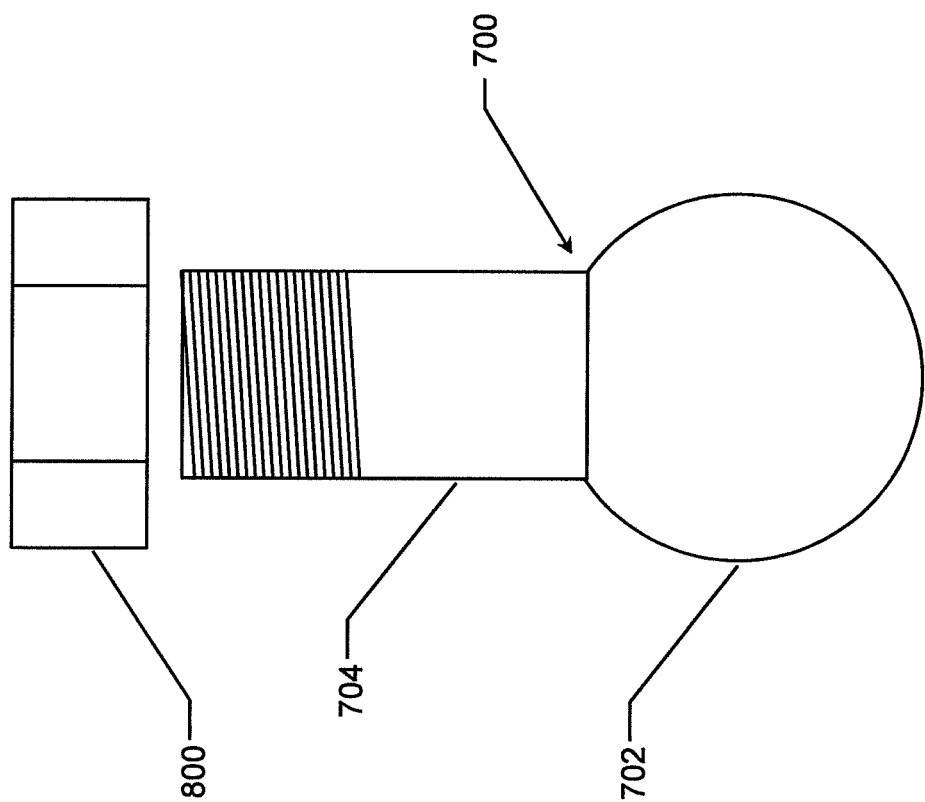
FIG. 11 is a diagrammatic illustration showing an exemplary fastener used to secure a retaining member to a complementary retaining member as showing in FIGS. 8-10.

In the illustrated embodiment, fastening channels 510 are formed in a main body portion 512 of the complementary retaining member 500. Suitably, the channels 510 are sized, shaped and/or formed so as to receive and retain therein a head 702 of a bolt 700 (see FIG. 11) or other like fastener with a given tolerance such that limited play (i.e., movement) of a shaft 704 of the bolt 700 may be permitted. In practice, the bolt head 702 has a spherical or spheroidal shape and/or otherwise has an arcuate or oblique or other suitable surface thereon which allows for the aforementioned play when the bolt head 702 is received and retained in the channel 510. The channels 510 are generally defined by a bulbous pocket sized, shaped and/or otherwise formed to receive and retain the bolt heads 702 therein, and a gap sized to allow the bolt shafts 704 to pass therethrough without allowing the bolt heads 702 to pass therethrough. As shown, in one exemplary embodiment, the bulbous pocket may be generally and/or approximately cylindrically shaped, i.e., with a generally circular or cycloid or other like cross-section.

In practice, the holes 404 formed in the retaining member 400 are aligned with and/or otherwise in operative mechanical communication with the channels 510 such that when the bolts 700 are installed with heads 702 received and retained in the channels 510, the shafts 704 of such installed bolts 700 extend through the holes 404. Accordingly, nuts 800 or other like complementary fastener can be threated or otherwise connected and/or attached to an end of the bolt shaft 704 which protrudes from a side of the retaining member 400 opposite the complementary retaining member 500. In this manner, the retaining member 400 and complementary retaining member 500 are secured and/or otherwise joined or attached to one another, thereby defining the channel therebetween which receives and holds the dovetail portion 120 of the windscreen. Notably, the play provided (via the bolt heads 702 and channels 510) in the mechanical connection between the retaining member 400 and complementary retaining member 500 may permit a certain degree of movement or play relatively between the retaining member 400 and the complementary retaining member 500, thereby guarding against the dovetail portion 120 of the windscreen 100 being too rigidly held between the retaining member 400 and complementary retaining member 500.

Figure 12:
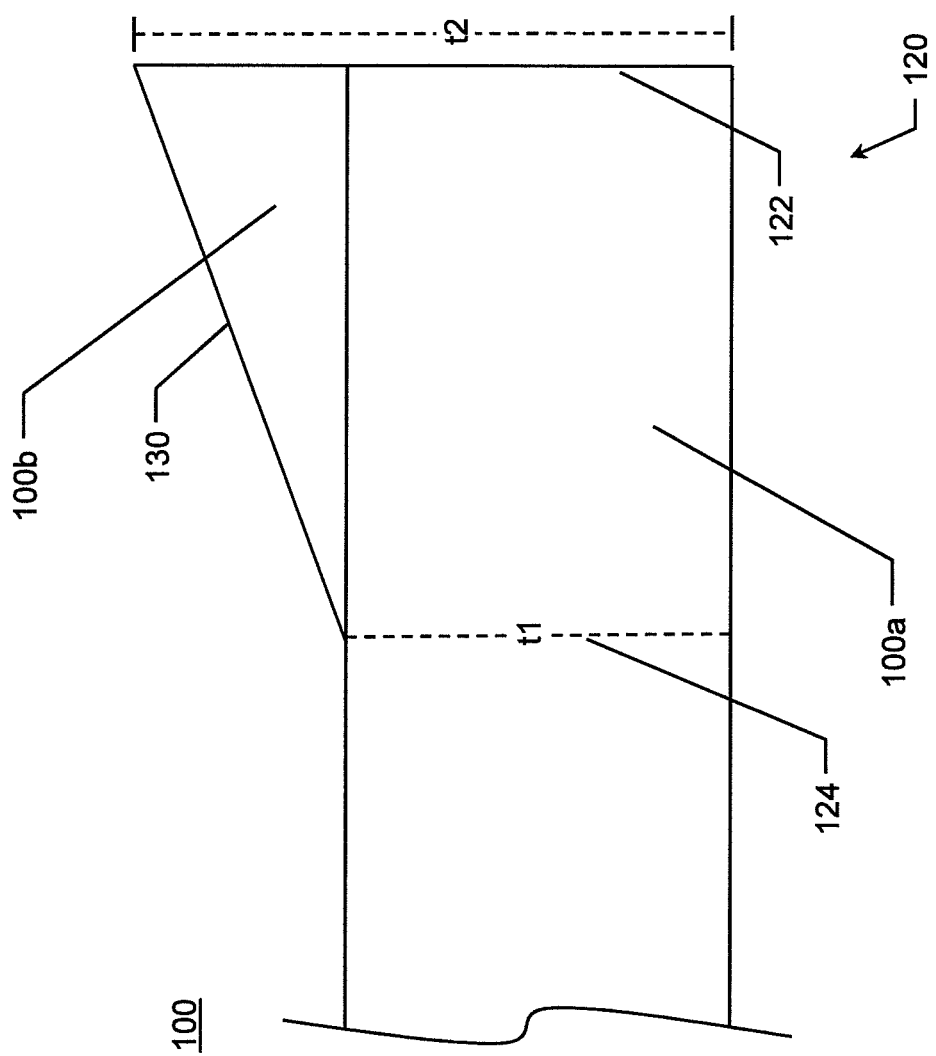
FIG. 12 is a diagrammatic illustration showing a partial cross-section view of another exemplary windscreen in accordance with aspects of the present inventive subject matter.

In one exemplary embodiment, for example, as shown in FIGS. 3 and 5, the windscreen 100 is a unitary piece of material with the dovetail portion 120 being formed around a periphery thereof. Alternately, as shown in FIG. 12, the windscreen 100 is constructed of a first or primary body part 100a and a separate second body part 100b. In practice, the materials out of which the body parts 100a and 100b are made and/or formed may be the same of different. For example, either one or both parts 100a and/or 100b may be made and/or formed from suitable windscreen materials such as glass, acrylic or some combination thereof. As shown, the second part 100b is generally wedge shaped when viewed in cross-section. As shown, the wedge shaped second part 100b is affixed to the primary body part 100a of the windscreen 100 at the periphery thereof, e.g., so to extend entirely around the periphery (or around a substantial entirety thereof). Suitably, the parts 100a and 100b may be joined together with a suitable adhesive or the like. In one exemplary embodiment, neither part 100a nor 100b is perforated with a through hole or the like or otherwise made or formed with such a hole. Similar to the embodiment shown in FIGS. 3 and 5, in the embodiment of FIG. 12, the wedge shaped part 100b of the windscreen 100 defines a dovetail portion 120 around the periphery thereof, which operates and/or functions in the same or similar fashion. In particular, as shown in FIG. 12, the dovetail 120 continues to include an outer portion or end 122 and an opposing inner portion or region 124, where the outer portion or end 122 is relatively thicker than the inner portion or region 124. For example, the outer end 122 of the dovetail 120 has a thickness t2, while the inner region 124 of the dovetail 120 has a thickness t1, where t2>t1. As shown, the relatively thicker periphery end or outer portion 124 of the dovetail 120 is more distal and/or farther from the central region or area 110 of the windscreen 100 (as compared to the inner portion 124 of the dovetail 120) and the relatively thinner inner region 124 is more proximate and/or relatively closer to the central region or area 110 of the windscreen 100 (as compared to the outer portion 122 of the dovetail 120). In the illustrated exemplary embodiment, at least one oblique, sloping, inclined or otherwise gradual thickness reducing surface 130 (generally referred to herein nominally as the oblique surface) lies between the outer and inner portions of the dovetail 120.

Various aspects of inventive subject matter have been described herein with reference to exemplary and/or preferred embodiments. Obviously, modifications and alterations will occur to others upon reading and understanding the preceding detailed description. It is intended that the inventive subject matter be construed as including all such modifications and alterations insofar as they come within the scope of the appended claims or the equivalents thereof.

The above elements, parts, methods, system, processes and/or apparatus have been described with respect to particular embodiments. It is to be appreciated, however, that certain modifications and/or alteration are also contemplated.

It is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. An aircraft windscreen, said windscreen comprising:
   a main body including a first side and a second side opposite the first side; and
   a dovetail shaped portion arranged continuously around a periphery of said main body;
   wherein said dovetail shaped portion is formed by three adjoining surfaces of said windscreen, said three adjoining surfaces including: (i) a side surface arranged at a periphery of the second side of the main body, (ii) an oblique surface which extends obliquely relative to a surface on the first side of the main body, and (iii) a lateral end surface which extends continuously uninterrupted between the oblique surface and the side surface; and
   wherein said three adjoining surfaces bound a solid wedge shape.

2. The windscreen of claim 1, wherein said dovetail shaped portion has an outer end and an inner region, said outer end being distal from a center of the main body relative to the inner region and a first thickness of said outer end being relatively greater than a second thickness of said inner region.

3. The windscreen of claim 2, wherein said oblique surface extends between the outer end and the inner region.

4. The windscreen of claim 3, wherein said windscreen has no through holes formed therein.

5. The windscreen of claim 4, wherein the windscreen is constructed of at least one of glass and a composite material.

6. The windscreen of claim 1, wherein said windscreen is constructed from two separate parts, including a primary part and a secondary part which is wedge shaped in its cross-section, said secondary part being affixed to the primary part around a periphery thereof to define the dovetail shaped portion.

7. An aircraft, said aircraft comprising:
   a body constructed of a first material and including an opening therein;
   a windscreen constructed of a second material and arranged within the opening of the body; and
   a retaining member attached to said body by a set of fasteners so as to secure said windscreen to the body;
   wherein said retaining member cooperates with said body to form a channel in which a dovetailed shaped portion formed at a periphery of said windscreen is seated so as to be retained without through holes being formed in the windscreen;
   wherein said windscreen includes a first side and a second side opposite the first side;

wherein said dovetail shaped portion is formed by three adjoining surfaces of said windscreen, said three adjoining surfaces including: (i) a side surface arranged at a periphery of the second side of the main body, (ii) an oblique surface which extends obliquely relative to a surface on the first side of the windscreen, and (iii) a lateral end surface which extends continuously uninterrupted between the oblique surface and the side surface; and wherein said three adjoining surfaces bound a solid wedge shape.

8. The aircraft of claim 7, wherein said first and second materials are different from one another.

9. The aircraft of claim 8, wherein said dovetail shaped portion has a distal end and a proximal end, said distal end being thicker than said proximal end.

10. The aircraft of claim 9, wherein when said dovetail shaped portion of the windscreen in seated in the channel, the proximal end extends through a gap formed between the retaining member and the body, and wherein said distal end is sized so as to not be freely passable through said gap when said retaining member is attached to said body.

11. The aircraft of claim 10, wherein said oblique surface extends between the distal end and the proximal end.

\* \* \* \* \*